(12) United States Patent
Hazama

(10) Patent No.: US 7,272,147 B2
(45) Date of Patent: Sep. 18, 2007

(54) INFORMATION TRANSFER EQUIPMENT

(75) Inventor: Hisamichi Hazama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1199 days.

(21) Appl. No.: 10/211,410

(22) Filed: Aug. 1, 2002

(65) Prior Publication Data

US 2002/0186659 A1    Dec. 12, 2002

Related U.S. Application Data

(63) Continuation of application No. PCT/JP00/00541, filed on Feb. 1, 2000.

(51) Int. Cl.
  *H04L 12/16*    (2006.01)
  *H04L 12/56*    (2006.01)
(52) U.S. Cl. ............... 370/400; 370/252; 370/242
(58) Field of Classification Search ............... None
  See application file for complete search history.

(56) References Cited

U.S. PATENT DOCUMENTS 6,262,973 B1 *  7/2001  Shiraishi et al. ............ 370/228
6,339,600 B1 *  1/2002  Hazama ...................... 370/458
6,590,908 B1 *  7/2003  Harasaki et al. ............ 370/508

FOREIGN PATENT DOCUMENTS

| JP | 5-114891  | 5/1993  |
| JP | 5-303560  | 11/1993 |
| JP | 9-261278  | 10/1997 |
| JP | 11-164337 | 6/1999  |

OTHER PUBLICATIONS

Shiohama et al. Supervisory Control Technology for New Synchronous Digital Transmission Equipment. Fujitsu vol. 42, No. 4 pp. 331-340, 1991.

* cited by examiner

*Primary Examiner*—Steven Nguyen
(74) *Attorney, Agent, or Firm*—Katten Muchin Rosenman LLP

(57) ABSTRACT

In an information transfer equipment which executes a monitoring control of a channel portion by transmitting/receiving monitoring control information between the channel portion and a common portion, the common portion stores predetermined information in conjunction with a flag indicating the predetermined information in a buffering portion, and transmits the predetermined information having the flag from the buffering portion when the data transmission of the predetermined information is required.

18 Claims, 14 Drawing Sheets

⇒ : MONITORING CONTROL INFORMATION

CPU WRITE ACCESS
EXTRACTION ONLY
TOWARD CH PORTION

COMMON PORTION⇒CH PORTION
FRAME PULSE 120

TDM FRAME DATA 112

PACKET DATA 105

FRAME PULSE 120

TDM FRAME 112 FROM COMMON PORTION TO CHANNEL PORTION (320 TDM FRAMES 112 = 1 TDM MULTI-FRAME 113)

STATUS SIGNAL/RPS COMMAND SIGNAL
(STP~ST7)

STATUS = TRANSMISSION CONTROL SIGNAL 106 + CHANNEL NUMBER
RPS COMMAND = BSW NUMBER SIGNAL 104 + RPS_SW DRIVE COMMAND 103

INFORMATION TRANSFER EQUIPMENT

This application is a continuation of international application number PCT JP00/00541, filed Feb. 1, 2000.

BACKGROUND OF THE INVENTION

1. Field of the Invention

The present invention relates to an information transfer equipment, and in particular to an information transfer equipment which executes a monitoring control of a channel portion by transmitting/receiving monitoring control information between the channel portion and a common portion.

2. Description of the Related Art

In recent years, a communication system has aimed at a high transmission capacity and an enhanced monitoring control function regardless of its kind, resulting in an enlarged hardware scale. In a system accomplishing the monitoring control function, it is important that an information transfer equipment works efficiently on the aspects of function and cost.

Generally, an information transfer equipment mounts thereon a microprocessor (CPU) and performs its main function with firmware/software. In particular, a function block which manages a monitoring control has achieved a speedup and a high-performance in the form of multi-CPU.

Also, such an information transfer equipment enlarged in its hardware scale as mentioned above is generally composed of a plurality of racks. Accordingly, the monitoring control apparatus must execute the monitoring control to all of the racks.

Specifically, a high-capacity communication system is composed of a channel portion for processings per transmission line having a certain unit of capacity called a channel, and a common portion for receiving information from the channel portion and for transmitting information to the channel portion. Generally, a plurality of the channel portions are mounted on the system. Therefore, the system is to have a plurality of racks in case a plurality of channel portions are mounted thereon, so that it is general to perform data transmission by physically connecting each of the channel portions and the common portion with numerous cables.

For example, in a conventional monitoring control system of a communication system adapted to SDH (Synchronous Digital Hierarchy), monitoring control information is transmitted between each of the channel portions and the common portion as follows:

(1) CPU bus access signals between a CPU (common portion) performing the monitoring control of the system and the channel portions;

(2) Order wire signals;

(3) Data communication channel signals; and (4) Radio protection switchover signals.

When signals such as the above-mentioned (1)-(4) are individually connected with leased cables, the competitiveness of the equipment is impaired in terms of size, cost, operational stability of the equipment, and the like. Therefore, the Japanese Patent Application No. 10-151620 by the inventors of the present invention is mentioned as a technology having an arrangement in which a synchronous communication path within the equipment is provided by integrating these signals, and the common portion and the channel portions are connected with a single system of a communication path for information transfer within the equipment.

In the information transfer equipment of the Japanese Patent Application No. 10-151620 (hereinafter, referred to as prior art information transfer equipment), as shown by a schematic arrangement in FIG .9, a multiplexer of a common portion 10 multiplexes and transmits, by broadcasting, monitoring control information 90 into a predetermined position of a Time Division Multiplexing (hereinafter abbreviated as TDM) frame. A demultiplexer of each of channel portions 50_1-50_7 receives the TDM frame and demultiplexes therefrom the monitoring control information 90.

Also, the multiplexer of the channel portions 50 multiplexes and transmits each of the monitoring control information 90_1-90_7, . . . (hereinafter, represented by a reference numeral "90") into a Time Division Multiple Access (hereinafter abbreviated as TDMA) frame based on a channel number preset for its own. A demultiplexer of the common portion 10 receives the TDMA frame and demultiplexes therefrom the monitoring control information 90.

Namely, the common portion 10 executes the TDM-multiplexing of plural kinds of the monitoring control information 90 on a transmission line 110 of one system and broadcasts it to the channel portions 50. Each of the channel portions 50 executes the TDMA-multiplexing of the monitoring control information 90 of its own on the reception line 111 of one system and transmits it to the common portion 10.

As a result, it becomes possible to connect the common portion 10 to the channel portions 50 with the information transfer equipment in which an interface is integrated to one system.

Hereinafter, the arrangement and the operation of the common portion 10 in the prior art information transfer equipment will be described referring to FIG .10.

The common portion 10 is provided with OW interfaces 21_1-21_i (hereinafter, represented by a reference numeral "21"), DCC interfaces 22_1-22_j (hereinafter represented by a reference numeral "22"), an RPS interface memory 23, and a CPU interface 11 respectively connected to an OW processor and a DCC processor (no reference numeral shown for both), an RPS LGC processor 20, and a CPU 1.

A write address data packet generator 12, a read controller 15, and a CPU read interface memory 16 are connected to the interface 11.

Also, CPU write packet buffers 13_1-13_k (hereinafter, represented by a reference numeral "13") are commonly connected to the packet generator 12. The packet buffer 13, the interfaces 21, 22, and the memory 23 are commonly connected to an input terminal of a multiplexer 45 along with a channel-specific (by-channel) transmission synchronous controller 44 and a multi-frame generator 46. An output terminal of the multiplexer 45 is connected to an interface processor 41, which is connected to transmission lines 110, 111 on the output and the input sides. The processor 41 is also connected to a demultiplexer 42, which is commonly connected to the interfaces 21, 22, the memory 23, the memory 16, and a channel-specific status manager 43. The status manager 43 is connected to the synchronous controller 44.

In addition, a timing generator 30 is commonly connected to the interfaces 21, 22, a write/read processor 34, a packet read controller 31, and a write controller 33. The write controller 33 is connected to the memory 16, and the write/read processor 34 is connected to the memory 23. A buffer flow controller 32 is connected to the packet read controller 31.

The timing generator 30 provides timing signals for the interfaces 21, 22, the packet read controller 31, the write controller 33, and the write/read processor 34 respectively, and provides the frame pulse 120 or the like for the multi-frame generator 46.

The multi-frame generator 46 generates, based on the frame pulse 120, a multi-frame marker (occasionally referred to as a multi-frame pulse) 116="1111" and a frame number 117 to generate a TDM multi-frame 113 into which the marker and the frame number are inserted, which is transmitted to the multiplexer 45.

The interfaces 21, 22 each have a built-in speed conversion buffer, which performs a serial conversion of E1, E2 byte data (EOW) respectively on a wireless and a wire circuit side of a parallel signal which is the monitoring control information sent from the OW processor and the DCC processor, and M1-RSDCC, M1-MSDCC byte data respectively on the wireless and the wire circuit side, Mn-RSDCC byte data on the wireless circuit side, and M2-RSDCC-M7-RSDCC byte data on the wire circuit side, which are temporarily stored in the built-in buffer. The byte data are multiplexed into a predetermined position of the TDM multi-frame 113 in the multiplexer 45 based on the timing signals from the timing generator 30.

The memory 23 temporarily stores radio protection switchover control information (an RPS_SW drive signal 103 and a BSW number signal 104) which is the monitoring control information sent from the RPS LGC processor 20. These signals are sent to the multiplexer 45 from the write/read processor 34 based on the timing signals from the timing generator 30, and are multiplexed into the predetermined position of the TDM multi-frame 113.

The packet generator 12 extracts, through the interface 11, only a CPU write signal (see FIG. 11A (①-④)) which is outputted onto the system bus of the CPU 1 at random for accessing each of the channel portions 50, and extract therefrom an address and data on the system bus of the CPU 1 to be packetized.

The packet buffer 13 stores the packet data divided into packet data amounts transmittable for one period (see FIG. 11B) of the TDM frame. The packet read controller 31 reads the packet data of a single TDM frame from the packet buffer 13 to be multiplexed into a predetermined slot of the TDM frame (see FIG. 11C (①,②).

It is to be noted that through the packetization by the packet generator 12, a 3-byte write address and 1-byte data are generated as a single packet data 105 that is the monitoring control information (see FIG. 11D).

Also, in the packet buffer 13, 15 pieces of packet data having 1-byte parity check data added thereto are sequentially written in the packet buffers 13_1-13_k as one block data.

Moreover, monitoring the remaining memory capacity of the packet buffer 13 and having found that it has reached a preset threshold value, the packet generator 12 extends the time than usual to return an acknowledge signal DACK to the main CPU through the interface 11. While waiting to receive the signal DACK, the main CPU does not access the channel portions 50. As a result, writing amount in the packet buffer 13 is restricted, thereby preventing the packet buffer 13 from overflowing.

The packet read controller 31 and the buffer flow controller 32 carry out a read control to the 15 packet data (105) CPU_WR1-15 and 1 byte parity data CPU_WR_PRT stored in the packet buffer 13 as 1 block data based on the timing signals from the timing generator 30 and send the same to the multiplexer 45, where the packet data 105 is multiplexed into the predetermined position of a TDM frame 112.

The status manager 43 manages a transmission control status of the channel portions 50 based on a received transmission status signal 98 of each of the channel portions 50, and sends a transmission control signal 106 and a channel number to the synchronous controller 44. The transmission control signal 106 and the channel number are transmitted to the multiplexer 45 at the predetermined timing by the synchronous controller 44 and multiplexed into the predetermined position of the TDM multi-frame 113.

The multiplexer 45 transmits the TDM multi-frame 113, into which the above-mentioned signals sent from the interfaces 21, 22, the memory 23, the packet buffer 13, and the synchronous controller 44 are multiplexed, to the transmission line 110 through the processor 41.

It is to be noted that the signals transmitted from the common portion 10 to each of the channel portions 50 comprise a frame pulse signal 120 and a clock signal besides the above-mentioned TDM multi-frame 113 transmitted to the above-mentioned transmission line 110.

FIG. 12B shows an arrangement of the TDM frame 112 of the signal multiplexed by the multiplexer 45 and outputted therefrom. FIG. 12A shows the frame pulse 120, which is a frame synchronizing pulse of 8 kHz.

The TDM frame 112 comprises a multi-frame marker 116, a frame number 117, status/RPS command signals STP, ST1-ST7, E1ch, E2ch which are EOW signals on the wireless and the wire circuit sides, M1-RSDCC's and M1-MSDCC's which are DCC signals on the wireless and the wire circuit sides, an Mn-RSDCC signal on the wireless circuit side, M2-RSDCC-M7-RSDCC signals on the wire circuit side, one SSMB signal SSMB (④), two SSMB signals DUMY, 15 CPU write signals CPU_WR1-15 which compose the packet data 105, and data WR-PRY which are parity check data of the packet data 105. Each of them has slots whose number is shown in FIG. 12B with a unit slot being composed of 8 bits.

In addition, one TDM multi-frame 113 is composed of the TDM frame 112 aggregated by 320 frames. When the multi-frame marker 116 is "1111", indicating the first frame of the multi-frame, "0"-"319" frames are inserted into the slot of the frame number 117 in synchronization with this multi-frame marker 116.

It is to be noted that a guard time slot GT is inserted into a suitable position of the TDM frame 112 in consideration of a wireless data transfer.

FIG. 12C shows an arrangement of the status/RPS command signals STP, ST1-ST7, which comprise the guard time GT of 8 bits, the status of 8 bits, and the RPS command of 16 bits. The status signal comprises the transmission control signal 106 and the channel number, and the RPS command signal comprises the SW number signal 104 and a SW drive command 103.

In the above-mentioned prior art information transfer equipment, means for accommodating CPU bus in communication path for transferring information within the equipment are realized by making bus information of CPU write cycle a predetermined packet for performing a clock change to a writing clock in the channel portions. This clock change of the packet (from CPU clock to synchronous communication path clock) is realized by DP-RAM or the like.

A schematic flow of the CPU access (write operation) is shown in FIG. 13. Firstly, a firmware 1 executes a normal CPU write access processing by designating a monitored address (at step S301). Upon receipt thereof, the common portion 10 packetizes the CPU access data, and makes a completion notification to the firmware 1 in a CPU access completion processing (at step S302).

Moreover, the common portion 10 executes buffering the packet by 8 kHz unit (at step S303), and after receiving a write completion notification (at step S304), executes read processing synchronizing with an SD framing (at step S305), and transfers the packet to the channel portion 50 by a down frame (at step S306).

When writing in a real I/O register 200 is completed (at step S310) by the past CPU access corresponding processing (at step S307), the channel portion 50 confirms the data (or address) of the designated timeslot of the frame transmitted by the above-mentioned step S306. When it is the object packet, a pseudo CPU bus cycle is generated to make the bus accessible (at step S308). Moreover, the writing operation by the bus access is executed (at step S309), and the writing in the real I/O register 200 is executed (at step S311).

In the above-mentioned CPU access (writing operation), the firmware 1 accesses the I/O register of the channel portions, with being completely unconscious of the packetization or of the existence of the DP-RAM (interim buffer), as an access medium equivalent to ordinary general-purpose memory or register. Thus, it is very beneficial to realize an information transfer function within the equipment for making the firmware unconscious of the hardware such as the interim buffer in terms of using the existing firmware. Moreover, the structure of the firmware can be simplified, thereby contributing to shortening the term of equipment developments.

However, in the prior art information transfer equipment, when a certain channel portion is powered ON/OFF or mounted/unmounted from the equipment under the normal-operation state, it has been required that the firmware executes re-setting the system operation information to the channel portion. This system operation information re-setting is a processing of a higher priority than other normal processings, so that when the firmware (CPU system) detects a necessity of the re-setting processing, the normal operation has to be suspended until the predetermined information is derived a work table to be developed to the channel portion.

For such a re-setting processing, a time of approximately 100 msec. is required, which corresponds to 10% of a monitoring polling cycle (generally on the order of 1 sec.) of normal operation. Specifically, in an SDH wireless multiplexer where multi-channelization is noticeable, the simultaneous power ON/OFF of a plurality of channels is not a rare case, so that assuming the worst case of all of the channels, the system processing performance is to extremely decline.

Also, in the prior art information transfer equipment, there are following problems with respect to the operation of the firmware at the time of channel switchover.

Generally, in a wireless equipment, at least one standby channel is prepared in order to prevent the main circuit from entering a non-service state at the time of a circuit failure or an equipment failure, so that upon various failures in the above-mentioned main circuit, a radio protection switching is executed.

On the other hand, with the system being made to have multiple functions, each of the channel portions in the prior art information transfer equipment operates with individually different setting information according to the system setting information.

Therefore, when executing radio line switchover, a system setting change for the standby channel portion is required for the preparation of the switchover. Namely, before switching the SW, the system setting information of the original channel portion is required to be set in the standby channel portion. This processing is executed by the firmware in the prior art information transfer equipment.

In order to complete the switchover within a period as short as possible, it is common to use an interrupt signal for the notification to the firmware. However, by this interrupt processing, the performance of the monitoring control function executed by the firmware in a steady state declines.

FIG. 14 shows an example of a conventional radio protection switchover sequence. For example, SW_ALM issued by a SW39 of a station B assumes a switchover factor, so that an RPS LGC processor 20 of a station A notifies the firmware 1 of an SW switchover request (SWRQ). For the preparation of switchover to the standby channel portion, the firmware 1 executes processing for setting the system setting information having been set in the original channel portion before the switchover. The actual SW switchover of the channel portion is executed after the system setting for the standby channel portion is completed in both of the stations A and B.

As shown by the station A in FIG. 14, the setting change processing of the standby channel portion by the firmware requires a time of several 100 msec. which is longer compared to the time required for the transmission/reception of signals to/from both of the stations A and B or the SW switching processing, thereby accounting for most part of the time before the switchover completion of the radio line switchover sequence.

The time before the switchover completion directly leads to the non-service time (line disconnection time), so that it should be approximated to zero as much as possible. Generally, a time of 50 msec. or less is believed to be a permissive level, but this general requirement has not been fulfilled by the prior art.

SUMMARY OF THE INVENTION

It is accordingly an object of the present invention to provide an information transfer equipment comprising at least one channel portion; and a common portion for executing a monitoring control for each channel portion by transmitting/receiving monitoring control information to/from the channel portion, wherein the common portion executes a setting processing such as system setting information in the channel portion at a high speed without losing a fundamental characteristic of a CPU write access, and an overloaded state of a firmware is avoided.

[1] In order to achieve the above-mentioned object, in an information transfer equipment according to the present invention, the common portion has a CPU for executing the monitoring control with a firmware, a filtering portion for determining whether or not the monitoring control information from the CPU is predetermined information, a buffering portion for storing the predetermined information in conjunction with a flag indicating the predetermined information only when the monitoring control information is the predetermined information, a data transmission controller for controlling transmission of the monitoring control information from the common portion to each channel portion by executing a read control of the buffering portion, and a data transmission requesting portion for requesting a transmission of the predetermined information having the flag in the buffering portion through the data transmission controller upon determining that data transmission of the predetermined information is required.

[2] Also, with regard to the information transfer equipment according to the present invention in the above-mentioned present invention [1], the buffering portion may have a packet generator and a packet buffer, and the packet generator may convert the monitoring control information into packet data transmittable per each CPU access cycle to be written in the packet buffer.

[3] Also, with regard to the information transfer equipment according to the present invention in the above-mentioned present invention [1] or [2], the filtering portion may determine based on an address portion of the monitoring control information.

Namely, if information indicative of the predetermined information is set in an address portion of the monitoring control information, the filtering portion can determine whether or not the monitoring control information is the predetermined information based on the address portion thereof.

[4] Also, with regard to the information transfer equipment according to the present invention in any one of the above-mentioned present inventions [1] to [3], the common portion may further have a channel-specific status manager for grasping a status of the channel portion and for providing the data transmission requesting portion with status information, and the data transmission requesting portion may monitor the status information per channel portion to determine that the data transmission is required upon detection of a predetermined change of the status information.

Namely, the channel-specific status manager grasps the status of the channel portion and provides the data transmission requesting portion with status information. At this time, the data transmission requesting portion may monitor the change of the status information per channel portion, and may determine that the data transmission is required upon detection of a predetermined change of the status information to request the data transmission.

[5] Also, with regard to the information transfer equipment according to the present invention in any one of the above-mentioned present inventions [1] to [3], the common portion may further have an interface, separate from one for transmitting/receiving the monitoring control information, for receiving status information of the channel portion, and the data transmission requesting portion may monitor the status information per channel portion to determine that the data transmission is required upon detection of a predetermined change of the status information.

Namely, the common portion may further have an interface for receiving status information of the channel portion, separate from one for transmitting/receiving the monitoring control information. At this time, the data transmission requesting portion may monitor the change of the status information per channel portion, and may determine that the data transmission is required upon detection of a predetermined change of the status information to request the data transmission.

Thus, by separately providing an interface for receiving status information of each channel portion, the data transmission requesting portion is able to grasp the status of the channel portions, not by the indirect status information obtained from interfaces for transmitting/receiving the monitoring control information, but by the direct status information.

[6] Also, with regard to the information transfer equipment according to the present invention in the above-mentioned present invention [4] or [5], the status information may comprise information for notifying a mounted state or unmounted state of the channel portion.

Namely, information indicative of distinction between mounted/unmounted of the channel portions may be used as the status information.

[7] Also, with regard to the information transfer equipment according to the present invention in any one of the above-mentioned present inventions [4] to [6], the data transmission requesting portion may detect a transition, as the predetermined change, from a mounted state through an unmounted state returning to the mounted state.

Namely, the data transmission requesting portion may detect as the predetermined change a transition of the status information of the monitored channel portion from the mounted state through the unmounted state returning to the mounted state.

[8] Also, with regard to the information transfer equipment according to the present invention in any one of the above-mentioned present inventions [41] to [7], in presence of an unmounted channel portion upon a system start-up of the common portion, the data transmission requesting portion may detect a transition from an unmounted state to a mounted state as the predetermined change of the status information for the unmounted channel.

Namely, in the presence of an unmounted channel portion upon a system start-up of the common portion, the monitoring control information transmitted to the unmounted channel portion is discarded. Therefore, if the data transmission requesting portion detects as the predetermined change a change of the status information of the unmounted channel portion transitioning from an unmounted state to a mounted state, the data transmission can be requested.

In this case also, the usual operation of the firmware need not be suspended, so that it is made possible to avoid the firmware overloaded state.

[9] Also, with regard to the information transfer equipment according to the present invention in any one of the above-mentioned present inventions [1] to [8], the predetermined information may comprise system setting information, and the flag may comprise a system setting information flag.

The system setting information is information originally held by the CPU with a nonvolatile memory or the like, which requires to be transmitted to object channel portions at the time of system startup, re-mounting of the channel portions, channel switchover, or the like.

Therefore, by storing the system setting information in the buffering portion, the data transmission requesting portion have only to request reading the buffering portion as necessary not through the CPU, so that processing of system setting information or the like can be executed at a high speed. Thus, the usual operation of the firmware need not be suspended, so that it is made possible to avoid the firmware overloaded state.

[10] Also, with regard to the information transfer equipment according to the present invention in any one of the above-mentioned present inventions [4] to [6], the data transmission requesting portion may detect a transition from an unmounted state to a mounted state as the predetermined change.

Namely, the data transmission requesting portion determines that the data transmission is necessary upon detecting as the predetermined change a change of the status information of the monitored channel portion transitioning from an unmounted state to a mounted state Since the monitoring control information transmitted to the unmounted channel portion is discarded, if a change of the status information of the unmounted channel portion transitioning from an unmounted state to a mounted state is detected as the predetermined change to execute the data transmission, the predetermined information can be received by the object channel portion without fail.

[11] Also, with regard to the information transfer equipment according to the present invention in any one of the above-mentioned present inventions [1] to [6] and [10], the predetermined information may comprise monitoring control information for an unmounted channel portion, and the flag may comprise a transmission pending flag.

Namely, since the monitoring control information transmitted to a channel portion in an unmounted state is discarded, it is possible to store the monitoring control information for the unmounted channel portion as the predetermined information in conjunction with the transmission pending flag in the buffering portion.

[12] Also, the information transfer equipment according to the present invention in the above-mentioned present invention [9] may further comprise at least one standby channel portion, the data transmission requesting portion may request the data transmission controller to transmit system setting information of the channel portion stored in the buffering portion as system setting information of the standby channel portion when channel switching from one of the channel portions to the standby channel portion is executed.

Namely, since the system setting information of the channel portion is stored in the buffering portion, the system setting information may be transmitted as the system setting information for the standby channel portion as the switchover destination.

In this case also, the usual operation of the firmware need not be suspended, so that it is made possible to avoid the firmware overloaded state. Moreover, it is made possible to execute the channel switchover processing at a high speed.

[13] Also, with regard to the information transfer equipment according to the present invention in the above-mentioned present invention [12], the common portion may further have an address switcher, which switches an address of system setting information of the channel portion stored in the buffer portion to an address of the standby channel portion for a conversion into system setting information of the standby channel.

Namely, in order to convert the system setting information of the channel portion stored in the buffering portion into the system setting information of the standby channel portion, the address of the system setting information has only to be switched to the address of the standby channel portion. This processing may be executed by the address switcher.

[14] Also, with regard to the information transfer equipment according to the present invention in the above-mentioned present invention [12] or [13], the data transmission requesting portion may comprise a wireless switchover portion for executing a wireless switchover control.

BRIEF DESCRIPTION OF THE DRAWINGS

The above and other objects and advantages of the invention will be apparent upon consideration of the following detailed description, taken in conjunction with the accompanying drawings, in which the reference numbers refer to like parts throughout and in which.

DESCRIPTION OF THE EMBODIMENTS

Figure 1:
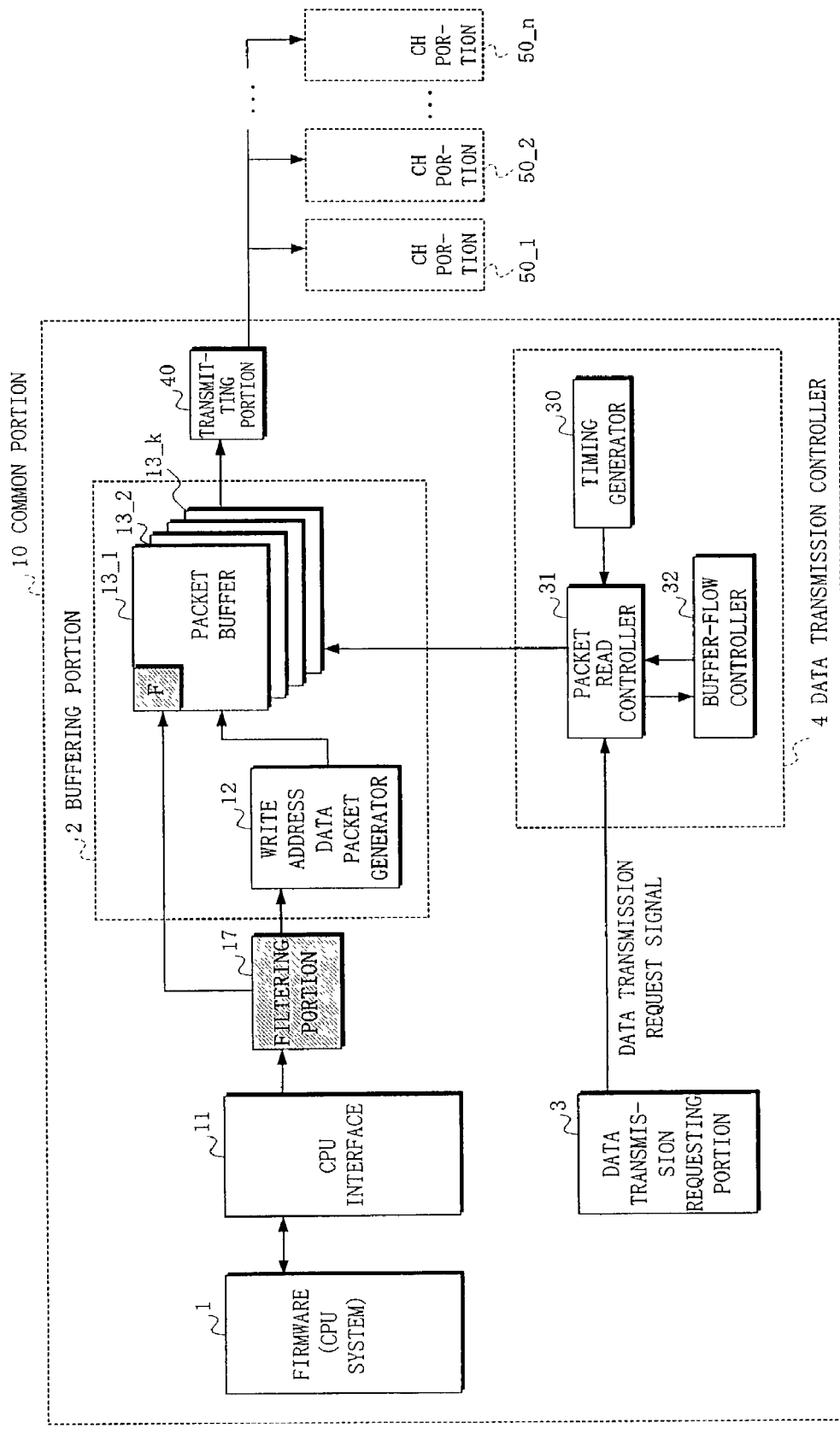
FIG. 1 is a block diagram for illustrating a schematic arrangement of an information transfer equipment according to the present invention.

FIG. 1 shows schematically a firmware of a CPU 1 that executes the monitoring control in a common portion 10. A filtering portion 17 filters (extracts) monitoring control information from the CPU 1 based on whether or not it is predetermined information. A buffering portion 2 stores the predetermined information in conjunction with a flag indicating the predetermined information only when the monitoring control information is the predetermined information. Therefore, when the monitoring control information is not the predetermined information, information indicating that the flag is "OFF" is stored in an area where the flag is written in the buffering portion 2.

A data transmission controller 4 executes a read control of the buffering portion 2 based on the flag, and controls transmission of the monitoring control information from the common portion 10 to each of channel portions 50_1-50_n via the transmitting potion 40. Moreover, a data transmission requesting potion 3 requests a transmission of the predetermined information having the flag in the buffering portion 2 through the data transmission controller 4 upon determining that data transmission of the predetermined information is required.

Among the monitoring control information stored in the buffering portion 2, the predetermined information can be identified by the flag, so that upon receiving the request from the data transmission requesting portion 3, the data transmission controller 4 is able to identify the predetermined information by the flag and transmit the same.

At this time, since the data transmission requesting portion 3 requests the data transmission from the buffering portion 2 not through the CPU 1, a processing such as a system setting processing can be executed at a high speed, and the usual operation of the firmware need not be suspended, so that it is made possible to avoid the firmware overloaded state.

The buffering portion 2 has a packet generator 12, and packet buffers 13_1-13_k (hereinafter, represented by a reference numeral "13"). The monitoring control information is converted into packet data transmittable per each CPU access cycle and written in the packet buffer 13 by the packet generator 12. Thus, it is made possible to multiplex the monitoring control information into a TDM frame.

Embodiment (1)

Figure 2:
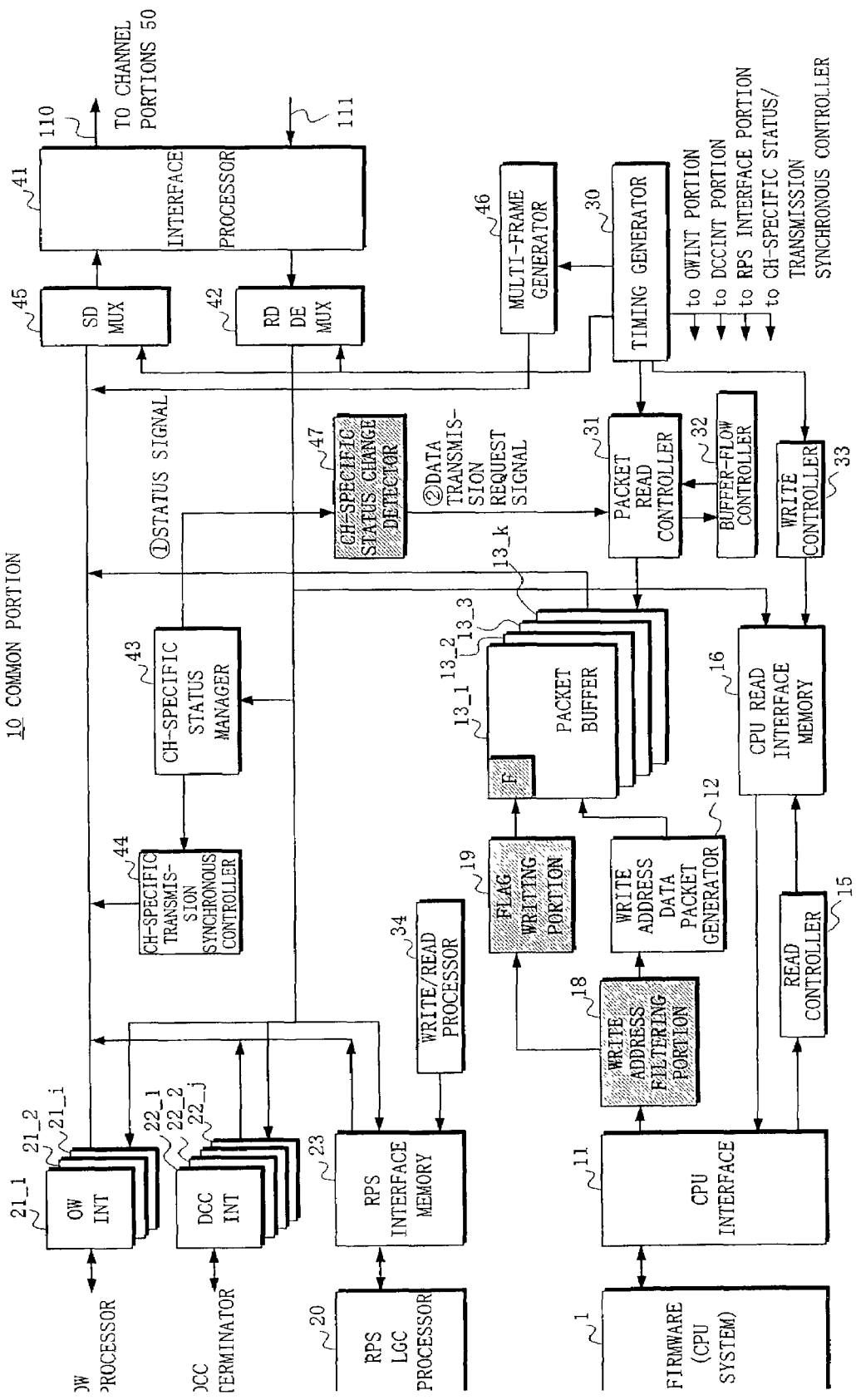
FIG. 2 is a block diagram showing a common portion in an embodiment (1) of an information transfer equipment according to the present invention.

FIG. 2 shows a common portion 10 of an embodiment (1) in an information transfer equipment according to the present invention. This common portion 10 has, in addition to the arrangement of the common portion 10 in the prior art information transfer equipment shown in FIG. 10, a write address filtering portion 18, an information setting flag writing portion 19, and a channel-specific status change detector 47, all shown with hatching.

Figures 11A, 11B, 11C, 11D:
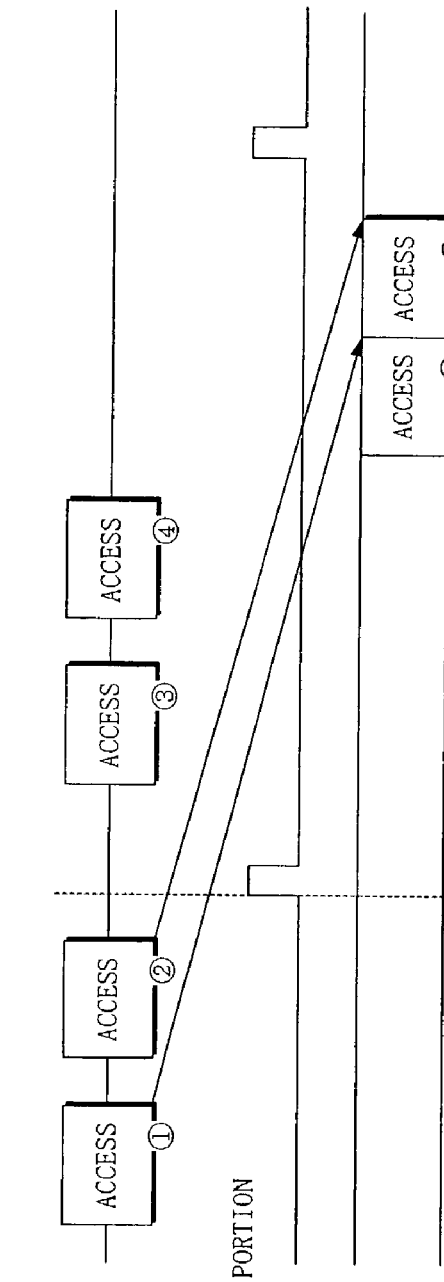
FIGS. 11A-11D are time charts showing an example of a principle operation of CPU write access in the information transfer equipment according to the Japanese Patent Application No. 10-151620.
Figures 12A, 12B, 12C:
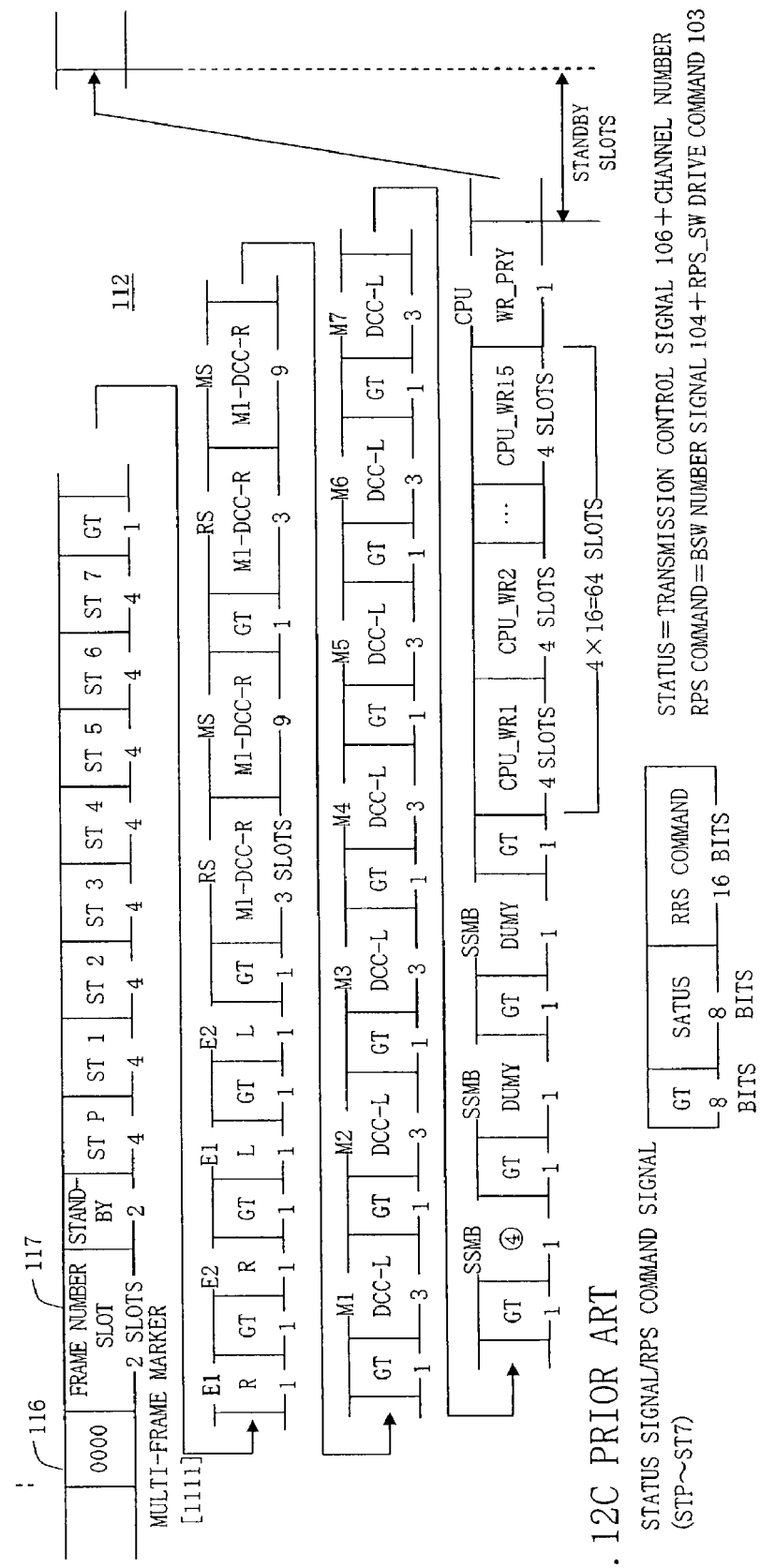
FIGS. 12A-12C are diagrams showing an arrangement of a frame used in the information transfer equipment according to the Japanese Patent Application No. 10-151620.
Figure 13:
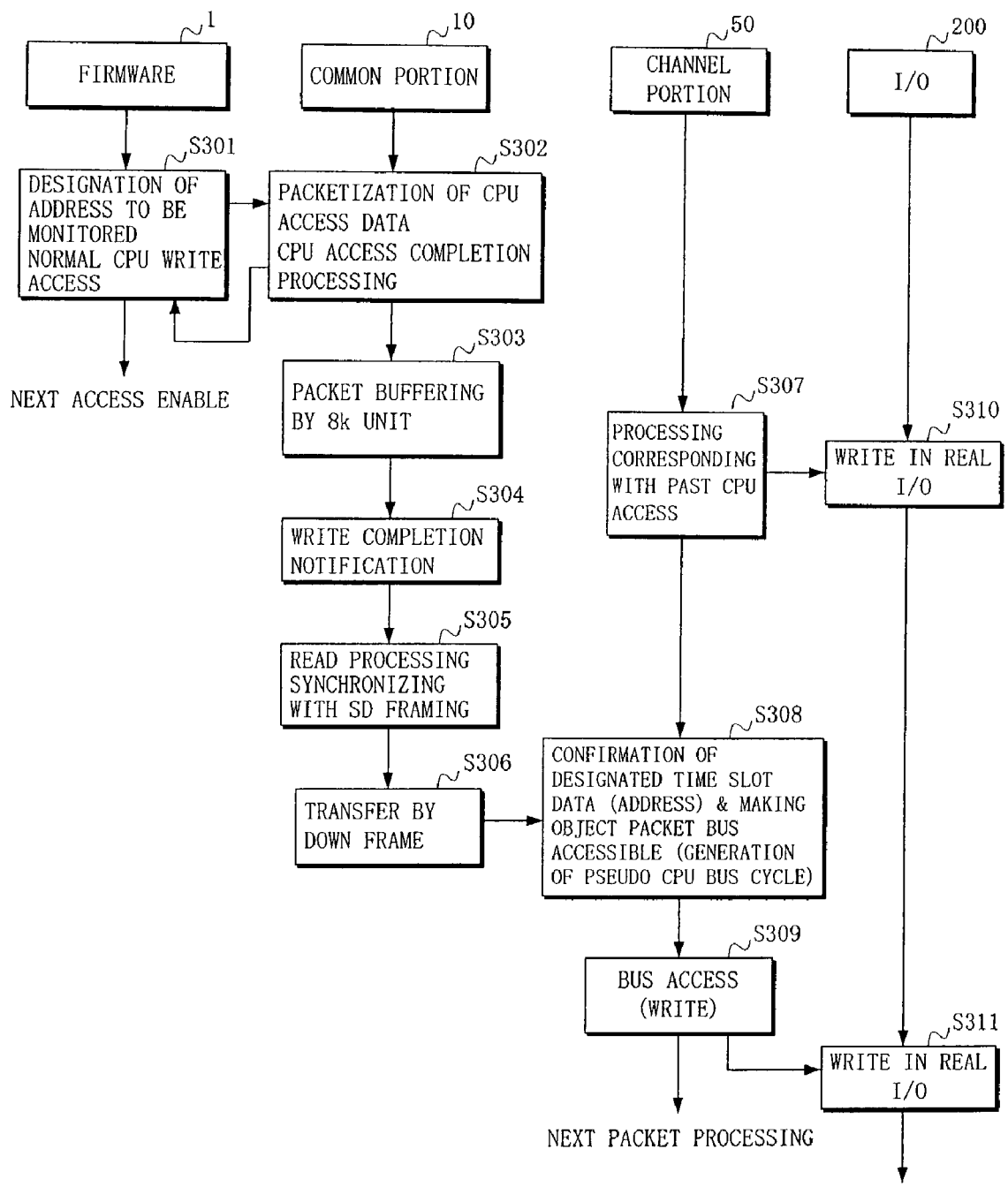
FIG. 13 is a flowchart for illustrating a CPU write access operation in the information transfer equipment according to the Japanese Patent Application No. 10-151620.

Namely, the write address filtering portion 18 receives monitoring control information (packet data 105 shown in FIG. 11D) from a firmware 1 through a CPU interface 11, and filters an address portion of the monitoring control information to determine whether or not the monitoring control information is predetermined information such as system setting information.

Also, when the packet generator 12 packetizes the monitoring control information as usual to be written in the packet buffer 13, the flag writing portion 19 sets a flag in the packet if the monitoring control information is the predetermined information based on the determination by the write address filtering portion 18.

FIG. 2 shows an example of a case where the monitoring control information is the predetermined information in which the monitoring control information is stored in the first surface 13_1, for example, of the packet buffer 13 with a flag added thereto. It is to be noted that in case monitoring control information is not the predetermined information, the information is stored in any one of packet buffer surfaces 13_2-13_k where a flag is unset.

Moreover, the channel-specific status change detector 47 grasps the mounted/unmounted state of the channel portions by receiving a channel-specific status signal ① from the channel-specific status manager 43, and transmits data transmission request signal ② to the packet read controller 31 upon detecting a predetermined change in the status signal ① to request the transmission of the predetermined information.

The packet read controller 31 usually reads the packet whose flag is unset based on the flag in the packet buffer 13, and reads the packet of the predetermined information whose flag is set when the data transmission request signal ② is received.

It is to be noted that if a specific area for the packet buffer 13 for setting the flag is preliminarily determined, writing/reading the predetermined information is made possible without specifically using the flag.

OPERATION EXAMPLE (1) OF EMBODIMENT (1)

Hereinafter, an operation example will be described when the predetermined information determined by the filtering portion 18 in the embodiment (1) shown in FIG. 2 is system setting information.

Figure 3:
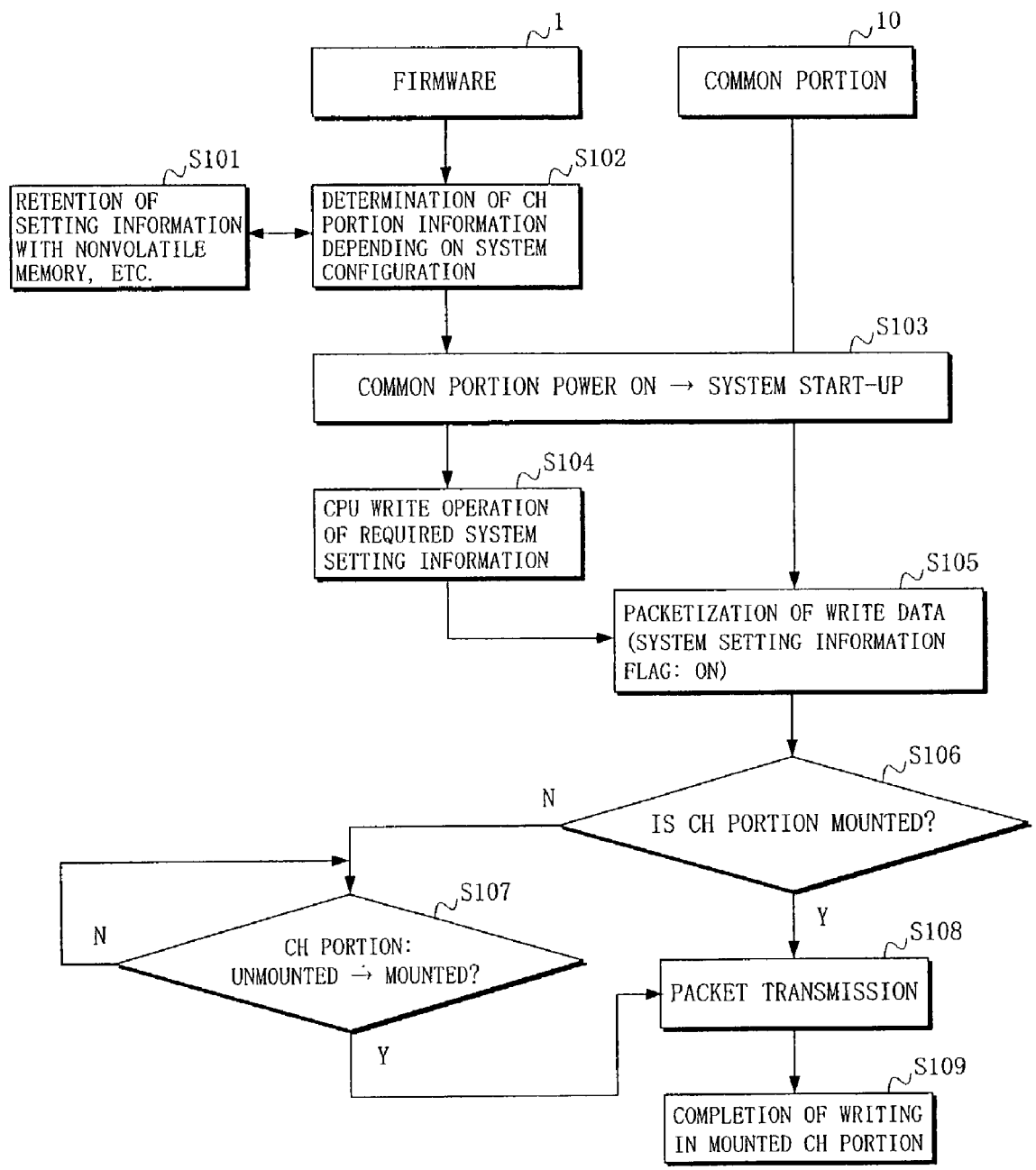
FIG. 3 is a flowchart showing an operation example (1) of an embodiment (1) of an information transfer equipment according to the present invention.

At system startup, that is a time when the power of the common portion 10 is turned "ON", the operations of the firmware 1 and the common portion 10 will be described referring to FIG. 3.

Usually, in the firmware 1 at system startup, the information of the channel portions depending on the system arrangement is determined (at step S102) by the information held in a nonvolatile memory or the like (at step S101).

Therefore, the firmware 1 turns "ON" the power of the common portion 10 to start up the system (at step S103), and executes CPU write operation of required system setting information (at step S104).

In the common portion 10, the packet generator 12 executes a packetization (at step S105) of the write data (monitoring control information). At this time, the filtering portion 18 determines whether or not the write data is the system setting information. If it is the case, the flag writing portion 19 writes the system setting information flag together with the packetized write data in the packet buffer 13 (at step S106).

Thereafter, the channel-specific status change detector 47 determines whether or not the channel portion 50 is in a mounted state based on the status signal ① from the channel-specific status manager 43 (at step S106). If the channel portion 50 is mounted, the channel-specific status change detector 47 transmits the data transmission request signal ② to the packet read controller 31, the packet is transmitted by the packet buffer 13 (at step S108), and the writing in the mounted channel portion is completed (at step S109).

In the presence of an unmounted channel portion, the packet transmission is suspended until the unmounted channel portion changes into a mounted state (at step S107). This is realized by the channel-specific status change detector 47 not transmitting the data transmission request signal ② to the packet read controller 31 for the unmounted channel portion.

Thereafter, when the unmounted channel portion changes into a mounted state, the channel-specific status change detector 47 transmits the data transmission request signal ② for the channel portion to the packet read controller 31, so that the packet is transmitted (at step S108), thereby completing the writing in the mounted channel portion (at step S109).

It is to be noted that the packet firstly transmitted to the channel portions upon system startup at the above-mentioned step S108 is the system setting information.

Also, when any one of the channel portions is re-mounted by the ON/OFF of the power or the like of the channel portions after the system setting of the channel portions is completed upon system startup as mentioned above, it becomes necessary to re-transmit the system setting information to the channel portion.

The system setting information requiring the re-transmission is that already stored in the packet buffer 13 together with the system setting information flag at the above-mentioned step S105. Also, the detection of the channel portion being re-mounted is made possible by the channel-specific status manager 43 detecting that a certain channel portion in the mounted state once changes into an unmounted state and then returns to the mounted state.

As mentioned above, after the completion of the system setting of the channel portions upon system startup, the channel-specific status manager 43 transmits the data transmission request signal ② to the packet read controller 31 upon detection of such a change that a certain channel portion in the mounted state once enters the unmounted state and then returns to the mounted state.

The packet read controller 31 having received the data transmission request signal ② transmits from the packet buffer 13 the system setting information for the channel portion whose above-mentioned status change is detected.

It is to be noted that clearing the flags can be executed when the common portion 10 is powered "OFF" (not shown). Also, it is possible to clear the flags by detecting when the system setting information becomes unnecessary.

Figure 10:
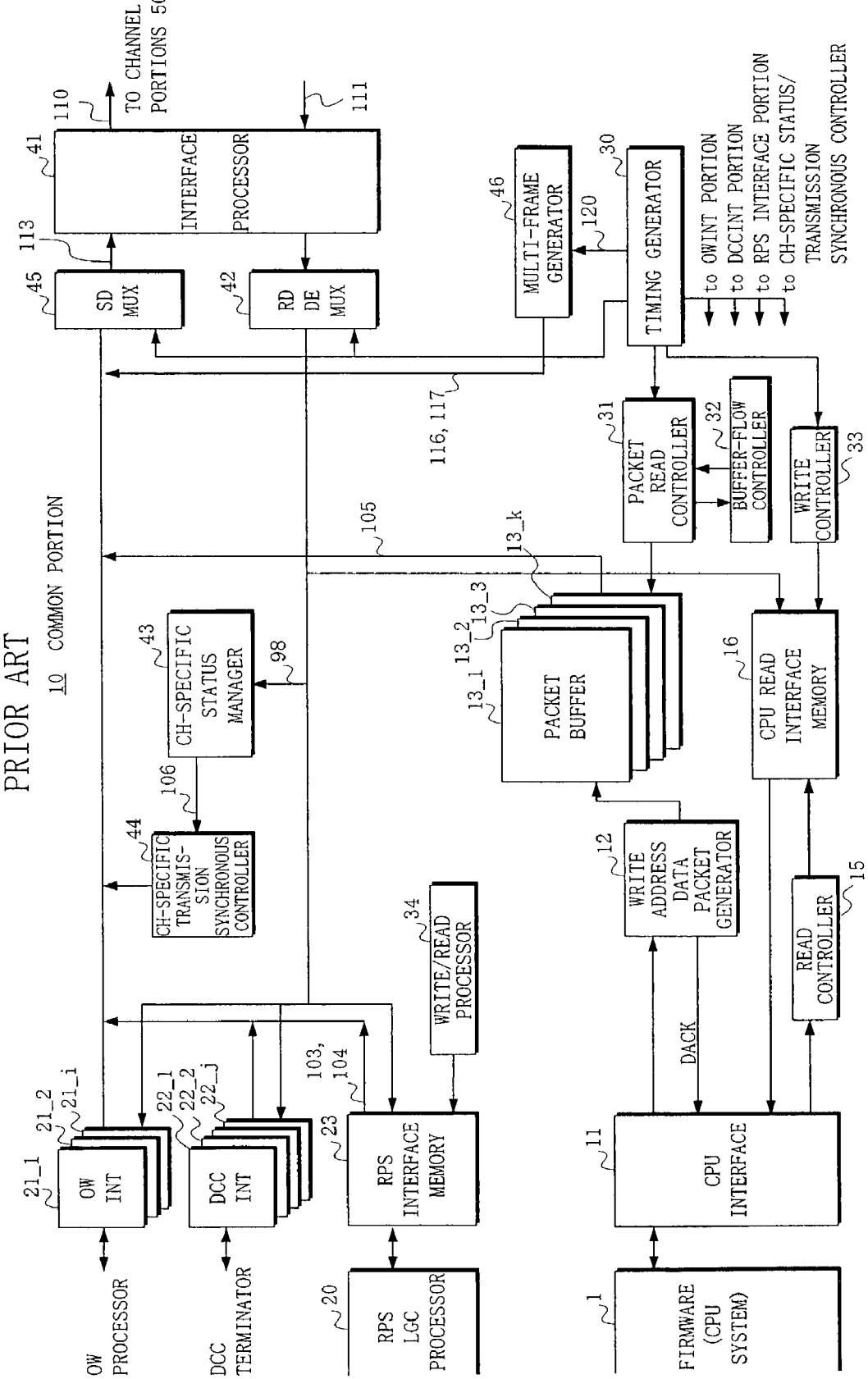
FIG. 10 is a block diagram showing an arrangement of a common portion in the information transfer equipment according to the Japanese Patent Application No. 10-151620.

Other operations are the same as those described in the prior art information transfer equipment shown in FIG. 10.

OPERATION EXAMPLE (2) OF EMBODIMENT (1)

Figure 4:
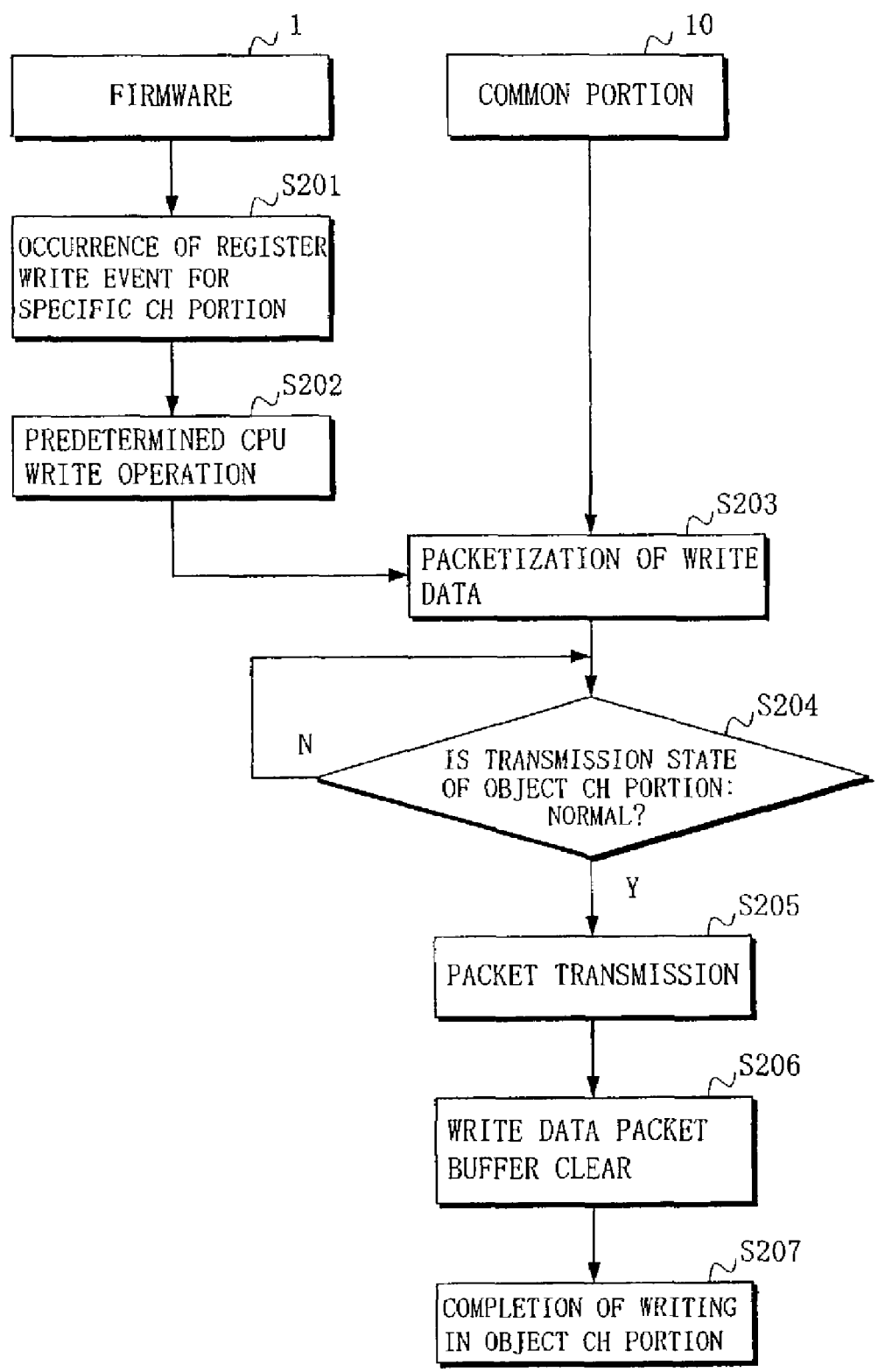
FIG. 4 is a flowchart showing an operation example (2) of an embodiment (1) of an information transfer equipment according to the present invention.

Hereinafter, an operation example of the embodiment (1) when the predetermined information determined by the filtering portion 18 is monitoring control information for the unmounted channel portion will be described referring to FIG. 4.

Upon occurrence of a register write event for a specific channel portion (at step S201), the firmware 1 executes a predetermined CPU write operation (at step S202).

In the common portion 10, the packet generator 12 packetizes the write data (monitoring control information) (at step S203). At this time, the filtering portion 18 determines whether or not the write data is the monitoring control information for the unmounted channel portion. If it is the case, the flag writing portion 19 writes the transmission suspension flag together with the packetized write data in the packet buffer 13.

Thereafter, the channel-specific status change detector 47 determines whether or not the write object channel portion is in the mounted state based on the status signal ① from the channel-specific status manager 43 and determines whether or not the transmission state of the write object channel portion is normal (at step S204).

If the transmission state of the write object channel portion is not normal, the transmission suspension flag is additionally set in the packet written in the buffer 13, so that the packet read controller 31 suspends the packet transmission. When the transmission state of the write object channel portion becomes normal, the status signal ① from the channel-specific status manager 43 changes from the unmounted state into a mounted state, so that the channel-specific status change detector 47 detects this change as a predetermined change to transmit the data transmission request signal ② to the packet read controller 31, and the packet is transmitted from the packet buffer 13 (at step S205). Subsequently, the packet buffer 13 clears the write data packet (and flag) (at step S206), thereby completing the writing in the object channel portion (at step S207).

Embodiment (2)

Figure 5:
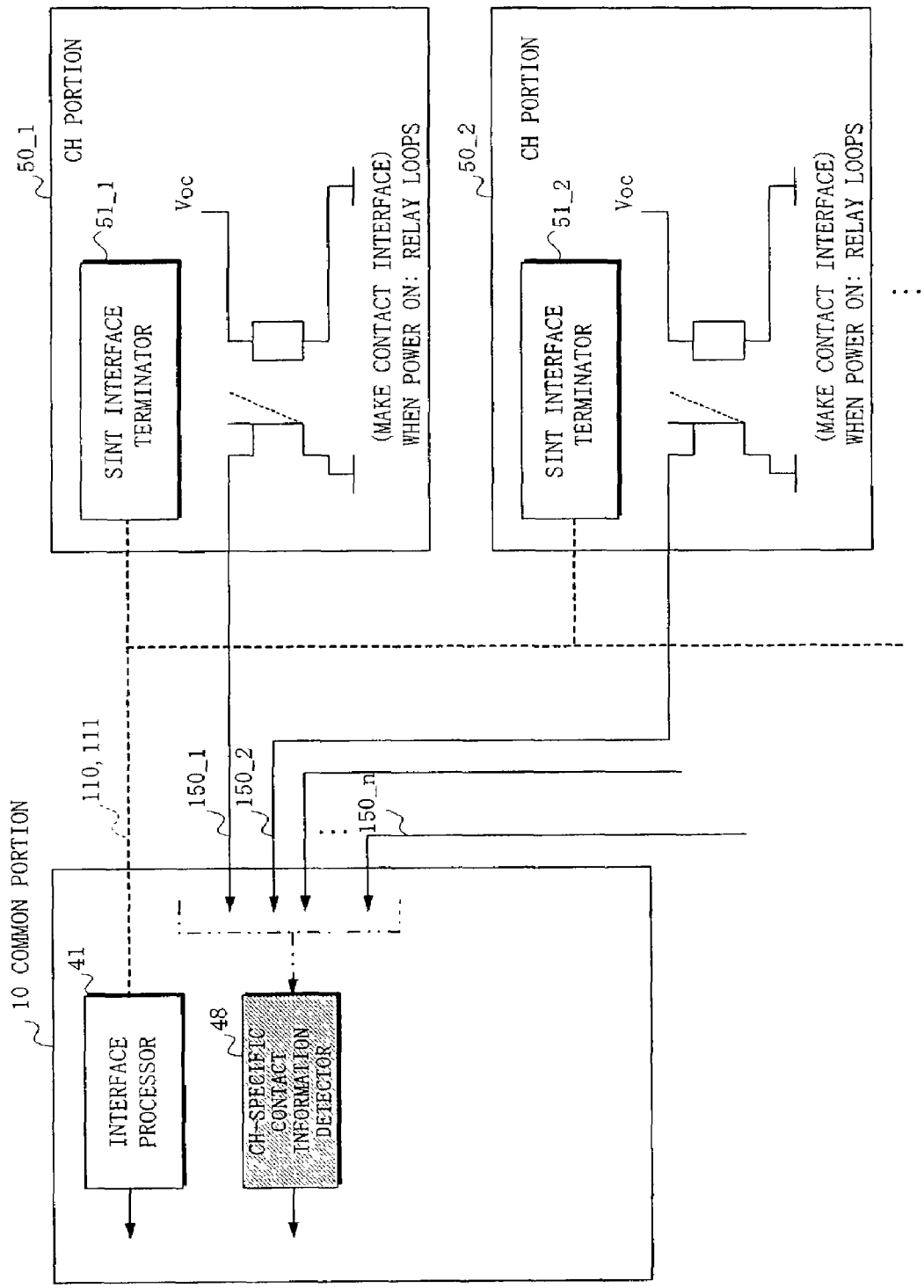
FIG. 5 is a block diagram showing a relationship between a common portion and a channel portion in an embodiment (2) of an information transfer equipment according to the present invention.

FIG. 5 is a diagram for illustrating the relationship between the common portion 10 and the channel portions 50 in an embodiment (2) of the information transfer equipment according to the present invention. As shown, in this embodiment, the channel portions 51_1-51_n respectively have a contact interface notifying a grounding signal level to the common portion upon mounting and entering an open state when unmounted or when the power is "OFF". Signals 150_1-150_n from the respective contact interfaces are notified to the channel portion 10 as status information of the channel portion. The signals 150_1-150_n are notified to the common portion 10 from a channel-specific contact information detector 48 through a different interface from the interface for transmitting/receiving the monitoring control information.

Thus in this embodiment, the signals 150_1-150_n operate independently of the SINT interface terminators 51_1-51_n provided in the channel portions 50, the interface processor 41 in the common portion 10, and the transmission lines 110 and 111.

Figure 6:
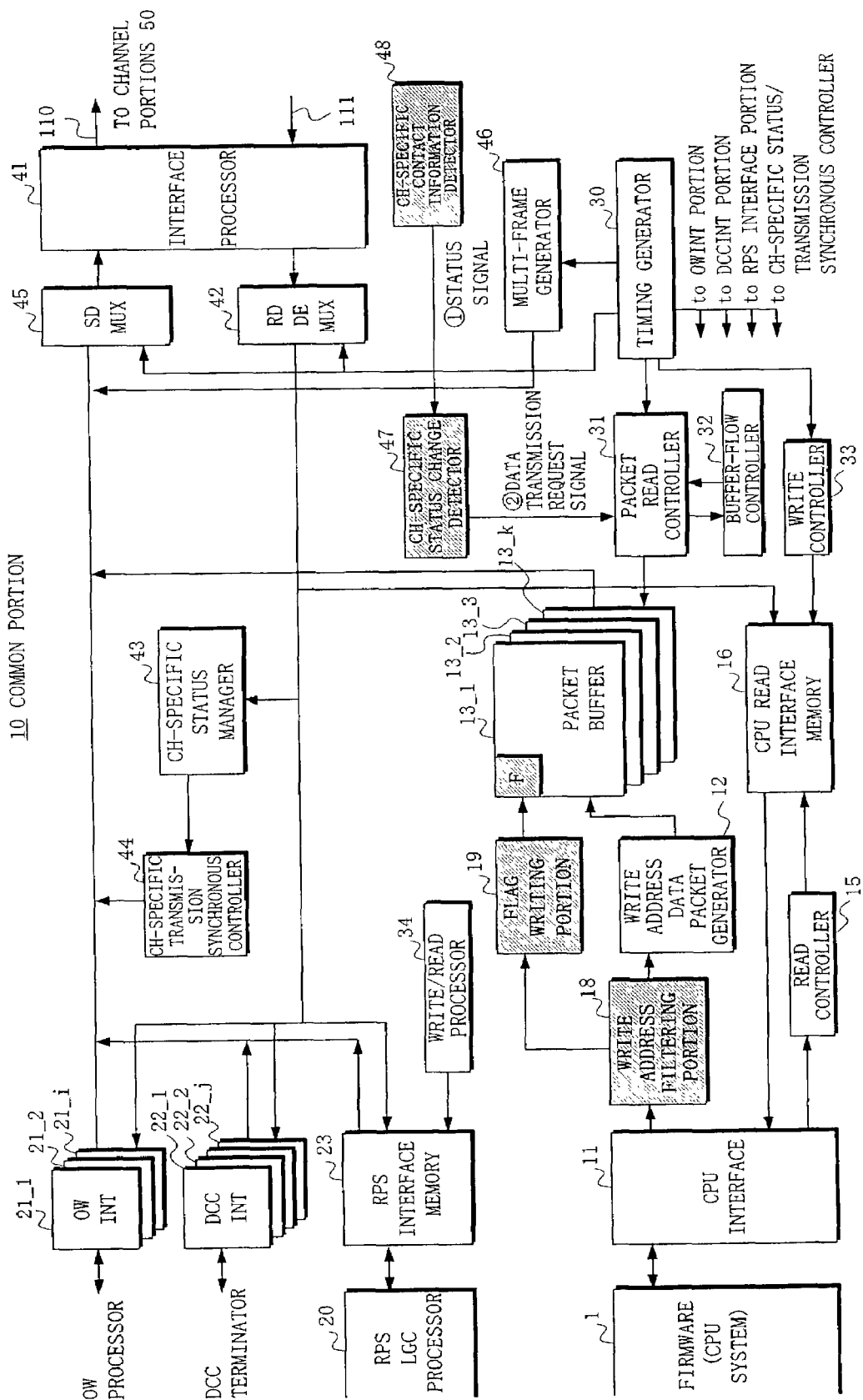
FIG. 6 is a block diagram showing an arrangement of the common portion in FIG. 5.

This state is shown in FIG. 6. The channel-specific status change detector 47 connected to the channel-specific contact information detector 48 but not to the channel-specific status manager 43 receives the channel-specific contact information from the channel-specific contact information detector 48 as the status signal ①, and thereafter the same operation as in the above-mentioned embodiment (1) is executed.

Embodiment (3)

Figure 7:
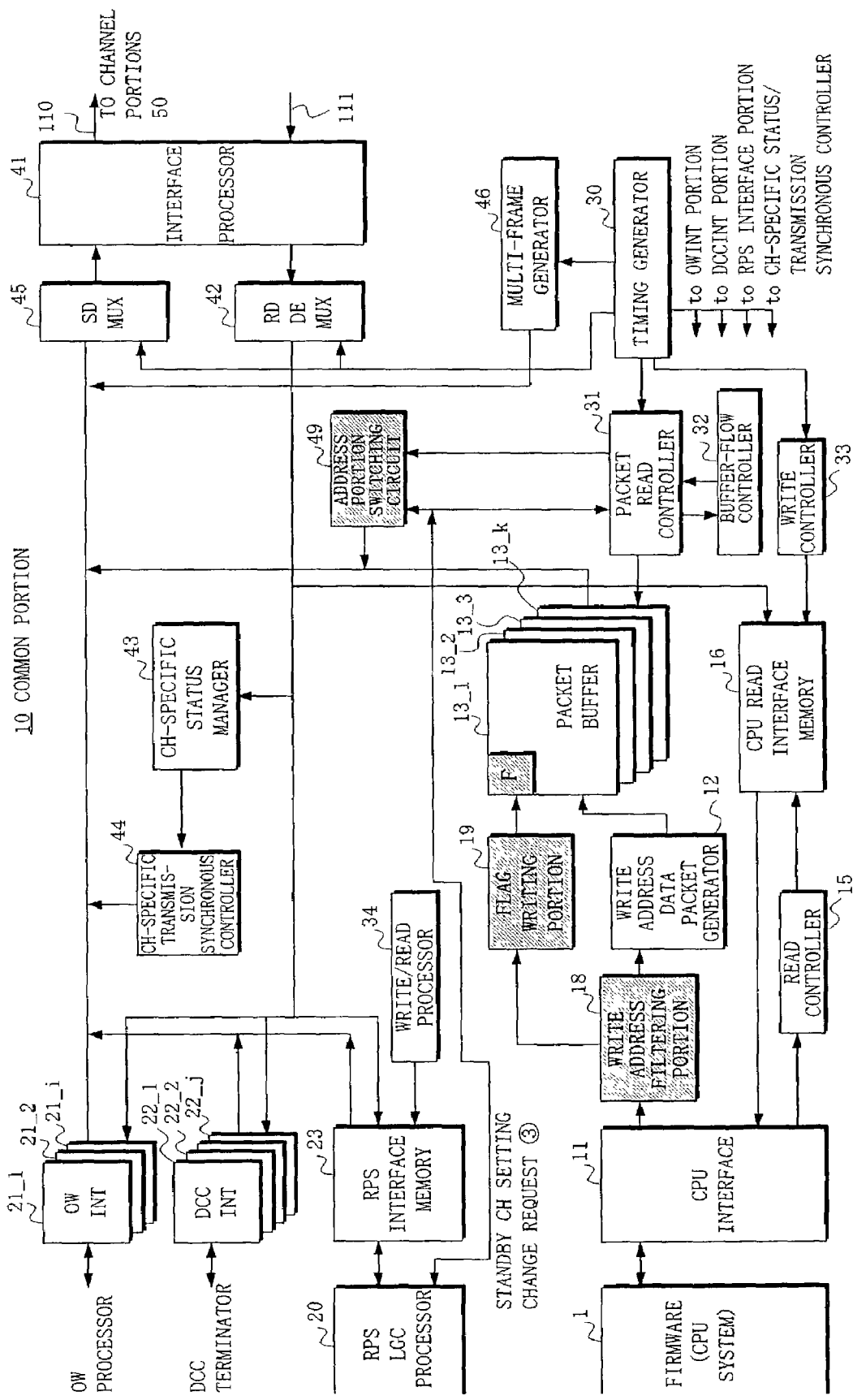
FIG. 7 is a block diagram showing a common portion of an embodiment (3) of an information transfer equipment according to the present invention.

FIG. 7 shows an arrangement of the common portion 10 in an embodiment (3) of the information transfer equipment according to the present invention. This common portion 10 has, in addition to the arrangement of the common portion 10 in the prior art information transfer equipment shown in FIG. 10, the write address filtering portion 18, the information setting flag writing portion 19, and an address portion switching circuit 49, all shown with hatching.

In FIG. 7, upon executing a switchover from a working channel portion to a standby channel portion, the RPS LGC processor 20 firstly transmits a standby channel setting change request ③ to the packet read controller 31 and the address portion switching circuit 49.

Since the standby channel setting change request ③ includes a working channel number of the switchover source and a standby channel number, the packet read controller 31 transmits the system setting information of the working channel portion that is the switchover source which has the system setting information flag being "ON" from the packet buffer 13 to the standby channel portion.

At this time, since the write address of the standby channel portion is different from the write address of the working channel portion that is the switchover source, it is required that the address area indicating the channel number is changed before transmission. The address area indicating the channel number is known, and the address of the standby channel portion is also known, so that a specific portion of the transmitting packet may be replaced by a specific value. This replacement is performed by the address switching portion 49.

Thus, in the case of channel switchover, the system setting information stored in the packet buffer 13, is transmitted as appropriate, with a flag set by the operations of the RPS LGC processor 20, the packet read controller 31, and the address portion switching circuit 49, so that the normal operation of the firmware is not suspended or interrupted.

Figure 8:
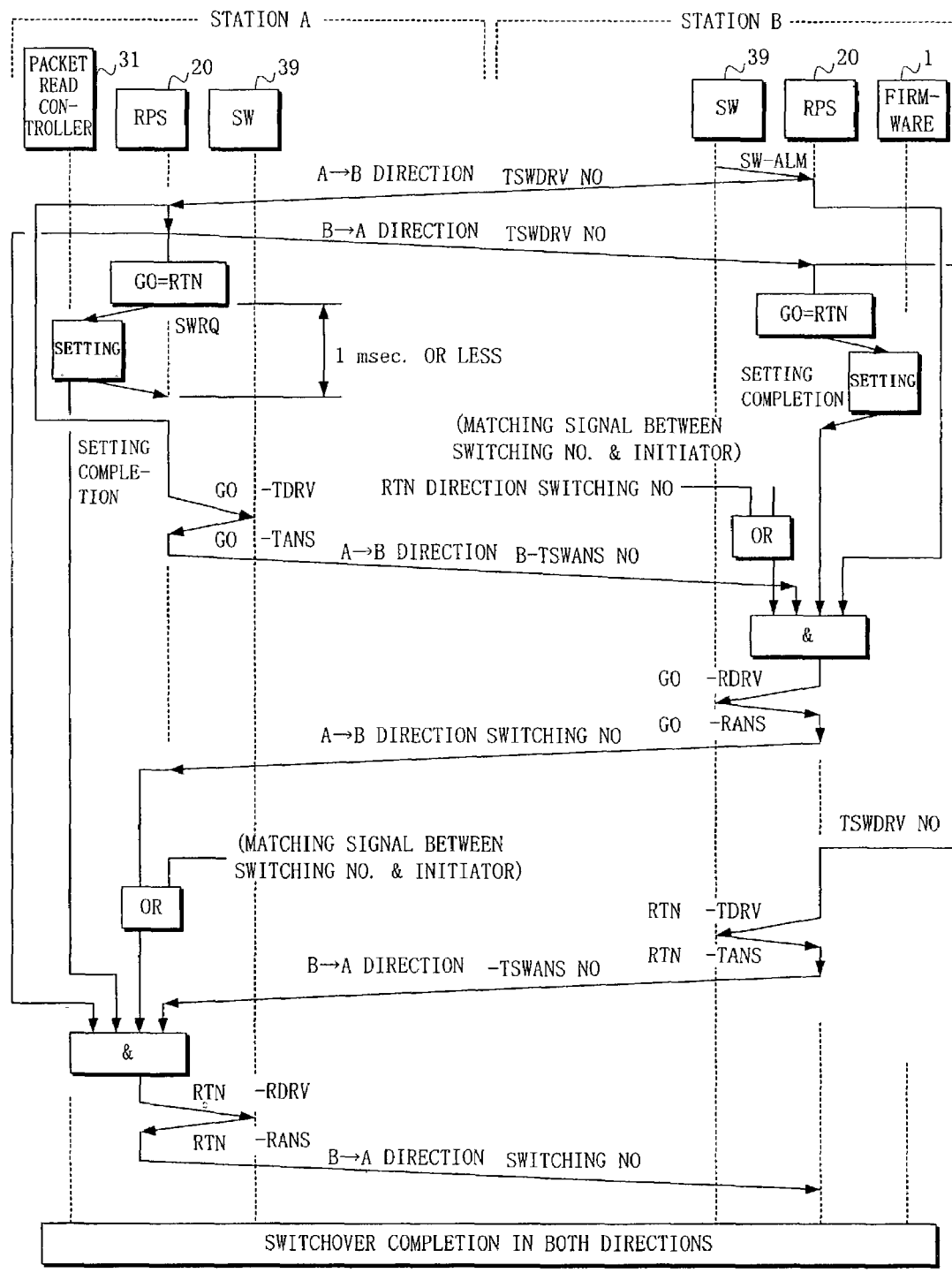
FIG. 8 is a sequence chart of a channel switchover in an embodiment (3) of an information transfer equipment according to the present invention.
Figure 9:
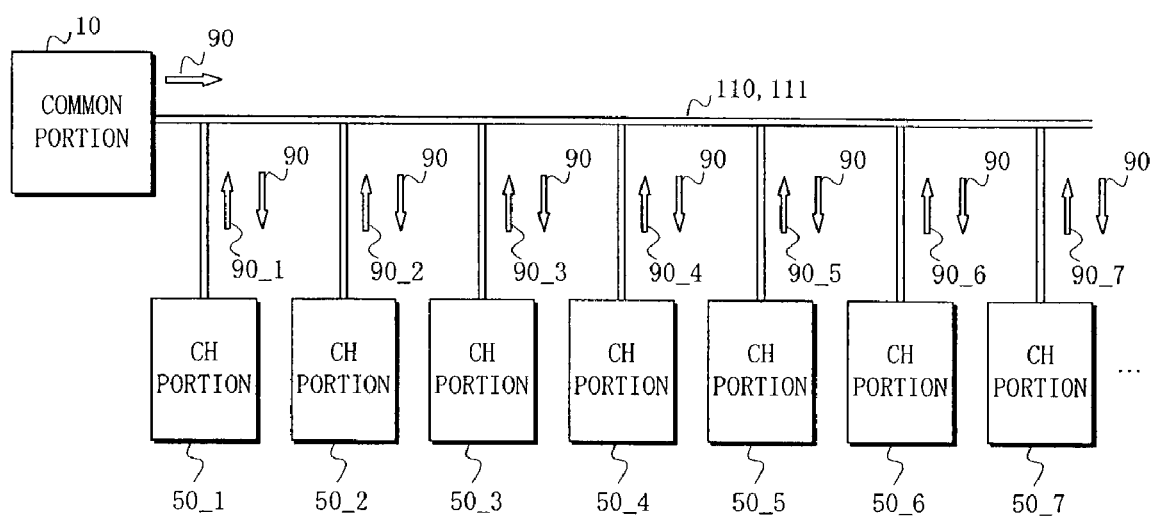
FIG. 9 is a block diagram showing an arrangement of an information transfer equipment according to the Japanese Patent Application No. 10-151620.
Figure 14:
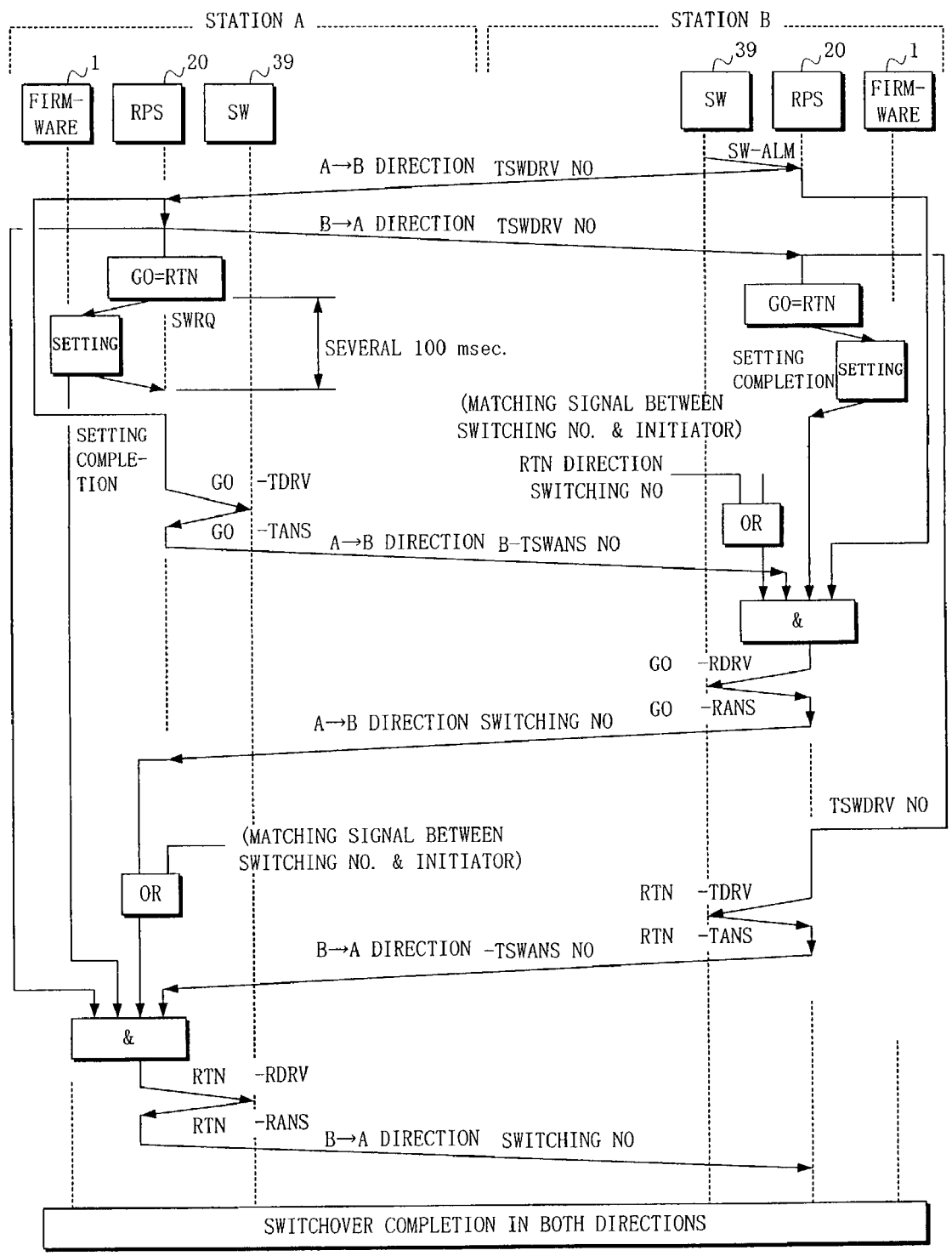
FIG. 14 is a sequence chart of channel switchover in the information transfer equipment according to the Japanese Patent Application No. 10-151620.

Therefore, when the present invention is applied to the station A, in the sequence same as the radio protection switchover sequence shown in FIG. 14 for example, the system setting of the standby channel portion in the station A is executed by the packet read controller 31, so that the firmware 1 is not involved as shown in FIG. 8. (It is to be noted that in FIG. 8, the station B is unchanged from the prior art for the purpose of comparison, so that the firmware 1 is involved.)

In the station A, the system setting information to be set in the standby channel portion has already been packetized as the system setting information of the channel portion which is the switchover source and stored in the packet buffer 13, so that the address portion of this packet has only to be converted into that for the standby channel portion to be transmitted.

Namely, in the station A, the system setting information read from the nonvolatile memory or the like by the firmware 1 and the packetization processing by the packet generator 12 can be omitted. Therefore, the time required for the system information setting of the standby channel portion can be greatly shortened to a degree of hundredths of the case where the firmware 1 is involved.

Also, in the station A, the normal operation of the firmware 1 is not suspended.

Upon completion of the packet transfer to the standby channel portion, in the same way as the firmware 1 in the station B, the packet transmission controller 31 in station A notifies the setting completion to the RPS LGC processor 20 so that the switchover sequence is continued.

Therefore, the time required for the radio protection switchover sequence is further shortened when the present invention is applied to both stations A and B, thereby shortening the time to less than 50 msec. that is the allowable level of non-service time required for the switchover.

As described above, an information transfer equipment according to the present invention is arranged such that a common portion stores predetermined information in conjunction with a flag indicating the predetermined information in a buffering portion, and transmits the predetermined information having the flag from the buffering portion when the data transmission of the predetermined information is required. Therefore, it has become possible to perform setting processing of system setting information or the like for the channel portions at a high speed, and to avoid a firmware overloaded state.

What we claim is:

1. An information transfer equipment comprising:
   at least one channel portion; and
   a common portion for executing a monitoring control for each channel portion by transmitting/receiving monitoring control information to/from the channel portion;
   the common portion having a CPU for executing the monitoring control with a firmware, a filtering portion for determining whether or not the monitoring control information from the CPU is predetermined information, a buffering portion for storing the predetermined information in conjunction with a flag indicating the predetermined information only when the monitoring control information is the predetermined information, a data transmission controller for controlling transmission of the monitoring control information from the common portion to each channel portion by executing a read control of the buffering portion, and a data transmission requesting portion for requesting a transmission of the predetermined information having the flag in the buffering portion through the data transmission controller upon determining that data transmission of the predetermined information is required.

2. The information transfer equipment as claimed in claim 1 wherein the buffering portion has a packet generator and a packet buffer, and the packet generator converts the monitoring control information into packet data transmittable per each CPU access cycle to be written in the packet buffer.

3. The information transfer equipment as claimed in claim 1 wherein the filtering portion filters an address portion of the monitoring control information.

4. The information transfer equipment as claimed in claim 1 wherein the common portion further has a channel-specific status manager for grasping a status of the channel portion and for providing the data transmission requesting portion with status information, and the data transmission requesting portion monitors the status information per channel portion to determine that the data transmission is required upon detection of a predetermined change of the status information.

5. The information transfer equipment as claimed claim 1 wherein the common portion further has an interface, separate from one for transmitting/receiving the monitoring control information, for receiving status information of the channel portion, and the data transmission requesting portion monitors the status information per channel portion to determine that the data transmission is required upon detection of a predetermined change of the status information.

6. The information transfer equipment as claimed in claim 4 wherein the status information comprises information for notifying a mounted state or unmounted state of the channel portion.

7. The information transfer equipment as claimed in claim 4 wherein the data transmission requesting portion detects a transition from a mounted state through an unmounted state returning to the mounted state as the predetermined change.

8. The information transfer equipment as claimed in claim 4 wherein in presence of an unmounted channel portion upon a system start-up of the common portion, the data transmission requesting portion detects a transition from an unmounted state to a mounted state as the predetermined change of the status information for the unmounted channel.

9. The information transfer equipment as claimed in claim 1 wherein the predetermined information comprises system setting information, and the flag comprises a system setting information flag.

10. The information transfer equipment as claimed in claim 4 wherein the data transmission requesting portion detects a transition from an unmounted state to a mounted state as the predetermined change.

11. The information transfer equipment as claimed in claim 1 wherein the predetermined information comprises monitoring control information for an unmounted channel portion, and the flag comprises a transmission pending flag.

12. The information transfer equipment as claimed in claim 9, further comprising at least one standby channel portion,
   the data transmission requesting portion requesting the data transmission controller to transmit system setting information of the channel portion stored in the buffering portion as system setting information of the standby channel portion when channel switching from one of the channel portions to the standby channel portion is executed.

13. The information transfer equipment as claimed in claim 12 wherein the common portion further has an address switcher, which switches an address of system setting information of the channel portion stored in the buffer portion to an address of the standby channel portion for a conversion into system setting information of the standby channel.

14. The information transfer equipment as claimed in claim 12 wherein the data transmission requesting portion comprises a wireless switchover portion for executing a wireless switchover control.

15. The information transfer equipment as claimed in claim 5 wherein the status information comprises information for notifying a mounted state or unmounted state of the channel portion.

16. The information transfer equipment as claimed in claim 5 wherein the data transmission requesting portion detects a transition from a mounted state through an unmounted state returning to the mounted state as the predetermined change.

17. The information transfer equipment as claimed in claim 5 wherein in presence of an unmounted channel portion upon a system start-up of the common portion, the data transmission requesting portion detects a transition from an unmounted state to a mounted state as the predetermined change of the status information for the unmounted channel.

18. The information transfer equipment as claimed in claim 5 wherein the data transmission requesting portion detects a transition from an unmounted state to a mounted state as the predetermined change.

* * * * *